United States Patent [19]

Kirschner et al.

[11] Patent Number: 4,682,049
[45] Date of Patent: Jul. 21, 1987

[54] PULSE SHAPER FOR INDUCTIVE TRANSMITTERS

[75] Inventors: Michael Kirschner, Pforzheim; Günter Rapp, Hemmingen; Martin Zechnall, Schwieberdingen, all of Fed. Rep. of Germany

[73] Assignee: Robert Bosch GmbH, Stuttgart, Fed. Rep. of Germany

[21] Appl. No.: 857,748

[22] PCT Filed: Sep. 9, 1985

[86] PCT No.: PCT/DE85/00310
§ 371 Date: Mar. 19, 1986
§ 102(e) Date: Mar. 19, 1986

[87] PCT Pub. No.: WO86/01860
PCT Pub. Date: Mar. 27, 1986

[30] Foreign Application Priority Data

Sep. 14, 1984 [DE] Fed. Rep. of Germany ....... 3433777

[51] Int. Cl.$^4$ ............................................. H03K 5/08
[52] U.S. Cl. .................................. 307/268; 307/290; 307/358; 307/515; 328/5
[58] Field of Search .............. 307/268, 351, 290, 358, 307/515, 359; 328/5, 28; 123/350, 352

[56] References Cited

U.S. PATENT DOCUMENTS

| | | | |
|---|---|---|---|
| 3,612,912 | 10/1971 | Schwartz | 307/290 |
| 3,801,830 | 4/1974 | Boyer | 307/290 |
| 4,258,324 | 3/1981 | Henrich | 324/392 |
| 4,311,924 | 1/1982 | Breckel et al. | 307/290 |

OTHER PUBLICATIONS

V. A. Scotto et al, "Differential Input Schmitt Trigger" IBM Technical Disclosure Bulletin vol. 16, No. 8 Jan. 1974, p. 2505.
"Motor-Elektronik", Robert Bosch GmbH, 1983.

Primary Examiner—John Zazworsky
Attorney, Agent, or Firm—Michael J. Striker

[57] ABSTRACT

A pulse shaper for inductive transmitters, in particular inductive crankshaft angle transmitters on internal combustion engines is suggested, wherein a Schmitt-trigger is connected with the output of the transmitter. A peak value detector (D1,C) is connected with the output of the transmitter and means are provided which set the trigger threshold of the Schmitt-trigger in dependency on the output of the peak value detector.

4 Claims, 1 Drawing Figure

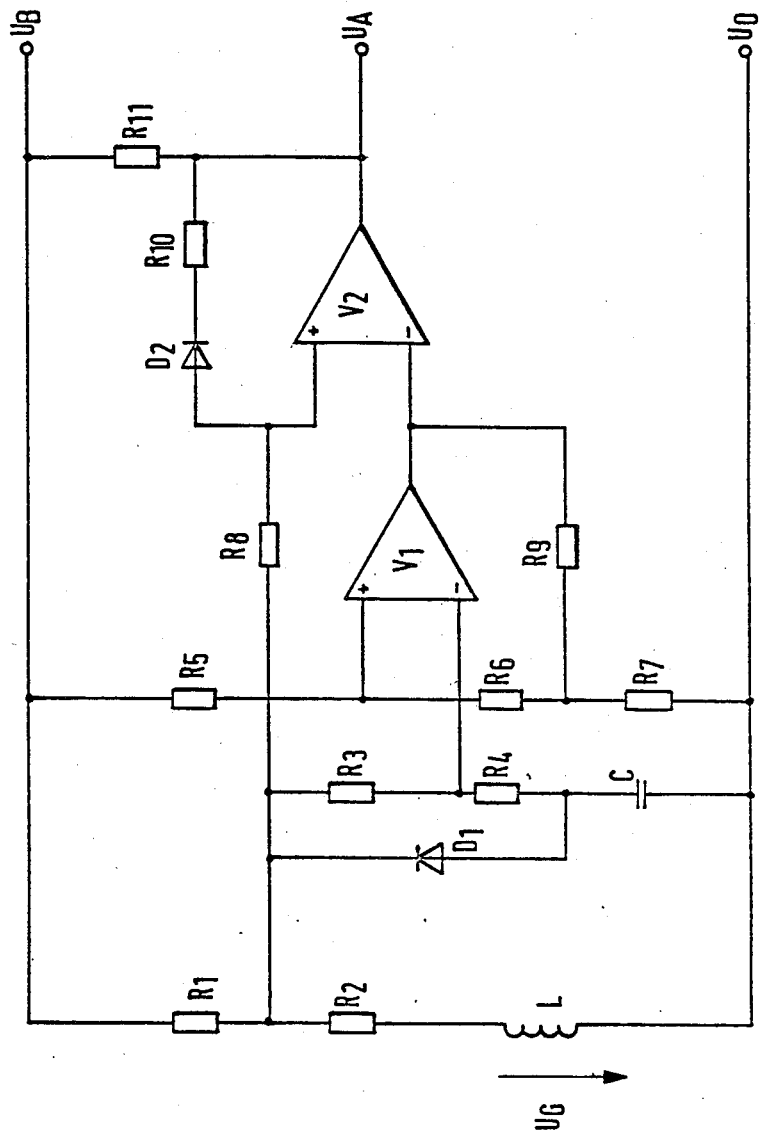

PULSE SHAPER FOR INDUCTIVE TRANSMITTERS

STATE OF THE ART

The invention is based on a pulse shaper for inductive transmitters, in particular crankshaft angle transmitters on internal combustion engines in accordance with the type of the main claim.

A pulse shaper for inductive transmitters is already known from the publication "Motor-Elektronik", Robert Bosch GmbH, 1983. The inductive transmitter is a crankshaft angle transmitter on an internal combustion engine which emits an alternate voltage. In order to process this alternated voltage in an electronic control device for the internal combustion engine, the alternate voltage is reshaped into rectangular current pulses. A Schmitt-trigger is provided as a pulse shaper for such a purpose. Thereby, the stable hysteresis of the Schmitt-trigger simultaneously increases the nonsensitivity with respect to low interferences. However, erroneous pulses are generated at the output of the Schmitt-trigger during interferences which extend beyond the hysteresis threshold of the Schmitt-trigger.

ADVANTAGES OF THE INVENTION

In contrast thereto, the pulse shaper in accordance with the invention and in accordance with the type of the main claim is advantageous in that at least one trigger threshold of the Schmitt trigger is not fixedly adjusted, but is adjusted by the peak value dectector in dependency on a peak value subsequent to the previously processed signal. Thus, a pulse shaping is provided which is aadaptively dependent on different transmitter amplitudes thus providing an improved safety against interference. If the subsequent processing of the shaped pulse requires a phase correct picking up of the transmitter signal, it is furthermore advantageous to fixedly set a trigger threshold of the Schmitt-trigger, in particular to the zero passage of the transmitter voltage.

DRAWING

One exemplified embodiment of the invention is illustrated in the drawings and is explained in detail in the subsequent description. Thereby, the single FIGURE illustates the electrical circuit diagram of a pulse shaper in accordance with the invention.

DESCRIPTION OF THE EXEMPLIFIED EMBODIMENT

The FIGURE illustrates a circuit diagram of an inductive transmitter with a subsequent series connected pulse shaper being operated by an operating voltage $U_B$ and a reference voltage $U_O$. For this purpose, the inductivity L of an inductive transmitter, which for purposes of simplification is not illustrated, is connected in series with two resistors R1, R2. Thus, the connecting point of the voltage divider R1, R2 represents the output of the transmitter. When a transmission voltage $U_G$ is induced in inductivity L, the divider voltage at the output of the transmitter is changed accordingly.

Negative peak values of the output voltage of the transmitter are picked up by a peak value detector consisting of a diode D1 and a capacity C. Furthermore, two resistors R4, R3 are connected in series between the capacity C and the output of the transmitter. From the connecting point of the resistors R4, R3 the detected negative peak values are fed to the inverting or minus input of a first differential amplifier V1. The output of the transmitter is connected by means of a resistor R8 with the non-inverting plus input of the second differential amplifier V2.

Each of the differential amplifiers V1, V2 is an operational amplifier having open-collector-output transistor. The outputs of the amplifiers have low resistance when the voltage on the minus input exceeds the inverting or voltage at the non-inverting or plus input and have a high resistance when the voltage on the plus input exceeds the voltage on the minus input.

The plus input of the first differential amplifier V1 is at a fixed potential determined by a voltage divider R5, R6 and R7 which is connected between the operating voltage $U_B$ and the reference voltage $U_O$. The connection point of a low Ohm resistor R7 and resistor R6 is connected to the output of the first differential amplifier V1 through a feedback resistor R9. Since the resistor R7 has very low Ohms with respect to the resistors R6, R5 the potential on the plus input of the differential amplifier V1 is only slightly changed by the feedback through resistor 9 when the first differential amplifier V1 switches. Nevertheless, a positive feedback is obtained which controls switching characteristics of the first differential amplifier.

The second differential amplifier V2 is connected with its minus input to the output of the first differential amplifier V1. The output of the second differential amplifier is connected to the operating voltage $U_B$ by means of a pull-up-resistor R11, and is directly connected with an output terminal at which the shaped pulses can be picked up as voltage $U_A$ The output of the second differential amplifier V2 is futhermore connected through a resistor R10 to the cathode of a second diode D2, whose anode is connected with the plus input of the second differential amplifier V2.

At a starting condition, i.e. when the induced transmitter voltage $U_G-0$ and no current flows through the capacity C, the potential of the minus input of the first differential amplifier V1 is equal to that at the output of the transmitter, i.e., at the connected point of the resistors R1, R2. The resistors R5, R6 and R7 are dimensioned in such a way that the same potential is applied at the connecting point of the resistors R6 and R7 and a somewhat higher potential at the plus input of V1. Hence, at the starting condition the output of V1 has a high resistance and the same potential is at the minus input of V2 as at the transmitter output.

Assuming that the output of the amplifier V2 has a high resistance and has been pulled by the pull up-resistor R11 to $U_B$, diode D2 is in blocking condition. The potential at the plus input is set through the resistor R8 to the potential at the output of the transmitter.

When a negative voltage $U_G$ is induced across the inductivity L the voltage on the plus input of the second differential amplifier V2 follows the voltage at the output of the transmitter through resistor R8. If this voltage falls below the potential at the minus input of the second differential amplifier V2 is switched on and a positive feedback is performed on the plus input through resistor R10 and the diode D2, so that the second differential amplifier V2 does not switch back during a renewed zero crossing of the transmitter signal. Simultaneously the capacity C is charged to the negative peak value of the transmitter voltage $U_G$ through diode D 1 and the resistor R2. The voltage on the minus input of the first differential amplifier V1 depends on the negative stored voltage on capacity C, from the momentary voltage at the transmitter output and the dividing ratio of the resistors R3, R4.

During a positive induced voltage $U_G$ across the inductivity L the ratio of the resistors R3, R4 as well as the voltage on the capacity C also determine at what time point the potential of the minus input of the first differential amplifier V1 exceeds the potential on the plus input. Then the output of the first differential amplifier V1 is switched on and a voltage is applied to the minus input of the second differential amplifier V2 which is lower than that on the plus input by about the forward voltage of diode D2. Now, the second differential amplifier V2 switches over to high resistance and its ouput resumes through the resistor R11 the value operating voltage $U_B$. Thus, the diode D2 is again in blocking condition.

During the next induced negative transmission voltage $U_G$ across the inductivity L, the second differential amplifier V2 will switch on again when the voltage on the plus input of the second differential amplifier V2 falls below the voltage of the minus input and thereby below the voltage drop across resistor R7. Therefore, the total arrangement constitutes a Schmitt-trigger which operates with a fixed trigger threshold, whose voltage level is set by the voltage drop on the resistor R7, and whose other trigger threshold is a switch voltage which is dependent on the previous negative peak value of the transmitter voltage.

We claim:

1. A pulse shaper for inductive transmitters, in particular inductive crankshaft angle transmitters on internal combustion engines, comprising a Schmitt trigger which includes a first and a second differential amplifier each having two inputs; first setting means connected to one input of the first amplifier to apply thereto a substantially fixed potential during an equilibrium condition of the Schmitt trigger; a peak value detector for coupling via said first setting means an inductive transmitter to the one input of the first amplifier, said detector including a detecting diode and a capacity for storing a detected peak value signal; second setting means connected to the other input of the first amplifier to set a fixed trigger threshold; the output of the first amplifier being connected to one input of the second amplifier and the other input of the second amplifier being connected to said inductive transmitter; a feedback diode connected between the output and the other input of the second amplifier, the feedback diode being in blocking condition when the second amplifier is switched off; and feedback means connected between the output of the first amplifier and the second setting means to adjust another trigger threshold whose value depends on a previously detected peak value signal stored in said capacity.

2. A pulse shaper as defined in claim 1 wherein said inductive transmitter is connected in series with a voltage divider whose connection point represents the output of the transmitter.

3. A pulse shaper as defined in claim 2 wherein said detecting diode and said capacity are connected in series between said output of the transmitter and a reference voltage line, and said first setting means including a voltage divider bridging said detecting diode and being series connected with said capacity.

4. A pulse shaper as defined in claim 1 wherein said differential amplifiers are operational amplifiers wherein said one inputs are inverting inputs and the other inputs are non-inverting inputs.

* * * * *